United States Patent
Kiriratnikorn et al.

(10) Patent No.: US 12,496,575 B2
(45) Date of Patent: Dec. 16, 2025

(54) CATALYST COMPOSITION FOR CYCLIC CARBONATE PRODUCTION FROM $CO_2$ AND EPOXIDES

(71) Applicant: PTT GLOBAL CHEMICAL PUBLIC COMPANY LIMITED, Chatuchak (TH)

(72) Inventors: Jiraya Kiriratnikorn, Pakkret (TH); Kunnigar Vongnam, Nonsang (TH); Nopparat Thavornsin, Pakkred (TH); Pornpen Sae-Ung, Muangnakornpathom (TH); Sophon Kaeothip, Chatuchak (TH); Anucha Euapermkiati, Chatuchak (TH); Khamphee Phomphrai, Buengkum (TH)

(73) Assignee: PTT Global Chemical Public Company Limited, Chatuchak (TH)

( * ) Notice: Subject to any disclaimer, the term of this patent is extended or adjusted under 35 U.S.C. 154(b) by 932 days.

(21) Appl. No.: 17/764,399

(22) PCT Filed: Sep. 30, 2020

(86) PCT No.: PCT/TH2020/000067
§ 371 (c)(1),
(2) Date: Mar. 28, 2022

(87) PCT Pub. No.: WO2021/066757
PCT Pub. Date: Apr. 8, 2021

(65) Prior Publication Data
US 2022/0379290 A1  Dec. 1, 2022

(30) Foreign Application Priority Data
Sep. 30, 2019 (TH) ................................ 1901006269

(51) Int. Cl.
| | | |
|---|---|---|
| *B01J 31/22* | (2006.01) | |
| *C07D 317/38* | (2006.01) | |
| *C07D 317/44* | (2006.01) | |

(52) U.S. Cl.
CPC ........ *B01J 31/2243* (2013.01); *C07D 317/38* (2013.01); *C07D 317/44* (2013.01); *B01J 2231/341* (2013.01); *B01J 2531/0252* (2013.01); *B01J 2531/62* (2013.01); *B01J 2531/842* (2013.01)

(58) Field of Classification Search
CPC .............. B01J 31/2243; B01J 2231/341; B01J 2531/0252; B01J 2531/62; B01J 2531/842; C07D 317/38; C07D 317/44
See application file for complete search history.

(56) References Cited

U.S. PATENT DOCUMENTS

2014/0066533 A1* 3/2014 Deng .................. B01J 31/1691
549/233

FOREIGN PATENT DOCUMENTS

| CN | 101045767 A | 10/2007 |
|---|---|---|
| CN | 101245117 A | 8/2008 |
| CN | 100549043 C | 10/2009 |

OTHER PUBLICATIONS

International Search Report in International Patent Application No. PCT/TH2020/000067 mailed Apr. 30, 2021 (2 pp.).
Written Opinion in International Patent Application No. PCT/TH2020/000067 mailed Apr. 30, 2021 (3 pp.).

* cited by examiner

*Primary Examiner* — Alicia L Otton
(74) *Attorney, Agent, or Firm* — Nixon Peabody LLP

(57) ABSTRACT

The present invention relates to catalyst composition for cyclic carbonate production from $CO_2$ and epoxides under mild conditions, which can effectively catalyze the cyclic carbonate synthesis and provides good selectivity to cyclic carbonate, wherein said catalyst composition comprising:
a) the metal complex as shown in structure (I):

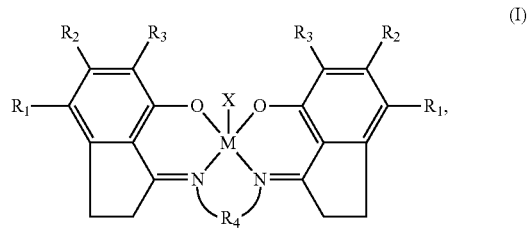

wherein,
M represents transition metal atom;
$R_1$, $R_2$, and $R_3$ represent independent group selected from hydrogen atom, halogen atom, alkyl group, alkenyl group, alkynyl group, alkoxy group, amine group, phenyl group, benzyl group, cyclic hydrocarbon group comprising hetero atom, perfluoroalkyl group, or nitro group;
$R_4$ represents group selected from alkylene group, cycloalkylene group, or phenylene group;
X represents group selected from hydrogen atom, acetate group, or triflate group; and
b) the organic compound as the co-catalyst selected from compound containing nitrogen, compound of quaternary ammonium salts, or compound of iminium salts.

35 Claims, No Drawings

CATALYST COMPOSITION FOR CYCLIC CARBONATE PRODUCTION FROM $CO_2$ AND EPOXIDES

CROSS-REFERENCE TO RELATED APPLICATIONS

This application is the United States National Phase of International Application No.: PCT/TH2020/000067, filed Sep. 30, 2020, which in turn claims priority benefit of Thailand Application No.: 1901006269, filed Sep. 30, 2019, the entire contents of which are herein incorporated by reference in their entirety.

TECHNICAL FIELD

The present invention relates to the field of science, in particular, to the catalyst composition for cyclic carbonate production from $CO_2$ and epoxides.

BACKGROUND ART

Cyclic carbonate is the valuable chemical and is very important in chemical and polymer industry, because it is used as the precursor for the polycarbonate and polyurethane productions. It is also used as the precursor for the polycarbonate diol (PCDL) production via dimethyl carbonate (DMC) synthesized from the esterification reaction between ethylene carbonate and methanol. This polycarbonate diol is suitable for production of polyurethane requiring better elasticity and mechanical properties, durability to weather conditions and fungi, resistance to oxidation, and ultraviolet ray protection.

Moreover, cyclic carbonate is also the important chemical in the production of many substances in polymer industry, for example in polyurethane industry. The cyclic carbonate, i.e. ethylene carbonate, is used in the production of 1,4-bis (2-hydroxyethoxy)benzene (HQEE) by the alkylation reaction with hydroquinone in order to be used as the spacer in the production of polyurethane having resistance property to chemicals and heat and high strength for using in the production of vehicle tire. In polyester industry, the ethylene carbonate is also used to synthesize 1,3,5-tris(2-hydroxyethyl)isocyanurate (THEIC) by N-alkylation reaction with cyanuric acid in order to be used as the cross-linking agent for the production of polyester resin having corrosion resistance property which is suitable for covering electrical cables.

Meanwhile, the cyclic carbonate is also regarded as the chemical popularly used directly to the polymer in order to improve polymer properties. For example, the ethylene carbonate addition is aimed to improve the properties of poly(ethylene terephthalate) polyesters which is the material used for the production of the conveyor belt. It is found that the obtained material has increase in chemical resistance property and has lower degradation rate. The addition of propylene carbonate helps to improve the surface property of poly(ethylene terephthalate) to be suitable for the synthesis of polyurethane foam for further using in laminate foam sheet production. Moreover, the cyclic carbonate can also be directly used as the cross-linking agent for the superabsorbent polymers (SAPs) in which cyclic carbonate reacts by building cross-links to cover as outer shell which increases the ability in liquid adsorption and can support the external force well to retain the shape and configuration of material. It also helps to reduce the release of the liquid adsorbed inside the material due to the external force. The polymer having such properties is popularly used to produce the diaper products.

Apart from the polymer industry, the cyclic carbonate is also popularly used as the polar aprotic solvent, especially the ethylene carbonate and propylene carbonate, because they have low toxicity, low vapour pressure, high flash point, and are more environmental friendly than other polar aprotic solvents such as dimethylformamide, hexamethylphosphoramide, N-methyl-2-pyrrolidone, dimethylacetamide, etc. Because of the cyclic carbonate property having high dielectric constant and good lithium coordinating ability, the cyclic carbonate is used as the electrolyte composition in lithium-ion battery which is popularly used in mobile electric appliances and electric car. It is also used as the medium in the production or synthesis of downstream chemicals such as dye, medicine, cosmetic, and especially the personal care products. Moreover, the cyclic carbonate can also be used as the fuel additive.

In the past, the cyclic carbonate could be synthesized from phosgene such as the synthesis of ethylene carbonate from phosgene and ethylene glycol. The synthesis process using said phosgene as precursor is the dangerous process because phosgene is high toxic substance. Therefore, the synthesis process of the cyclic carbonate from other precursors instead of phosgene has been developed and invented.

However, it is well known that carbon dioxide gas is regarded as the important carbon source of C1 building block that is popularly used as the precursor in the production of fuel and valuable chemicals because it has low toxicity, low cost, and it is renewable resource. Therefore, carbon dioxide has been used as the precursor in the synthesis of the cyclic carbonate, especially the synthesis of cyclic carbonate from the reaction between carbon dioxide and epoxides which had been disclosed firstly in the patent document DE 740,366. The advantage of this synthesis process is that the reaction has 100% atom efficiency of chemical process conversion. That means all atoms of precursor are changed to the product. This make the synthesis process via this reaction to be efficient in capturing and storing carbon dioxide in the form of cyclic carbonate product. The synthesis process of cyclic carbonate from carbon dioxide and epoxides had been commercially used firstly in 1950 by Huntsman company (Catalysis Applications/Chimica Oggi-Chemistry Today, 2012, 30, 3-5).

In patent document DE 740,366 that discloses the synthesis process of cyclic carbonate from carbon dioxide and epoxides for the first time, the catalyst used in said process was alkali treated activated carbon which was efficient in the synthesis of ethylene carbonate. The yield percentage of ethylene carbonate product was up to 90%. However, the patent document U.S. Pat. No. 2,667,497 A discloses the yield percentage of ethylene carbonate product from the synthesis process disclosed in the patent document DE 740,366. It was found that the yield percentage obtained was about 34%. Moreover, said patent document also discloses the use of solid magnesium halide or calcium halide as the catalyst for the synthesis of cyclic carbonate. However, the reaction condition was quite extreme: the temperature in the range of 150 to 250° C. and the pressure in the range of 500 to 2,000 psi.

At present, the synthesis process of cyclic carbonate from carbon dioxide and epoxides in the industry is operated at the temperature over 100° C. and the pressure over 20 bars. The commercial catalyst used in said process is quaternary ammonium salts and quaternary phosphonium salts (Catalysis Applications/Chimica Oggi-Chemistry Today, 2012, 30, 3-5), for example the synthesis process of ethylene carbonate from carbon dioxide and ethylene oxide using tetraethylammonium bromide catalyst in Bayer company and tetrabutylphosphonium iodide catalyst in Mitsubishi Company (Catalysis Science & Technology, 2012, 2, 1480-1484). Nevertheless, although said catalysts provide good selectivity to cyclic carbonate, they need to be operated under quite extreme conditions. Therefore, there have been researches and developments in the catalyst for the synthesis process of cyclic carbonate from carbon dioxide and epoxides under mild conditions in which they can still provide good catalytic efficiency and high selectivity to cyclic carbonate.

From the objectives above, there have been developments of the catalyst system for production process of cyclic carbonate from carbon dioxide and epoxides comprising 2 compositions which are Lewis acid catalyst and Lewis basic catalyst. Therefore, the cationic metal complex has been employed as the Lewis acid catalyst together with the Lewis basic co-catalyst such as tetrabutylammonium halides (TBAX), imidazolium halides, bis(triphenylphosphine) iminium halides (PPNX), and 4-dimethylaminopyridine (DMAP), etc.

Patent document U.S. Pat. No. 6,870,004 B1 discloses the synthesis of cyclic carbonate from carbon dioxide and epoxides under mild conditions using metal complex containing N,N'-bis(salicylidene)diamine (or salen) ligand as the catalyst together with the Lewis basic co-catalyst which was dimethylamino pyridine (DMAP). It was found to obtain quite high yield percentage of cyclic carbonate. Robert L. Paddock et al. (Journal of the American Chemical Society, 2001, 123, 11498-11499) discloses the synthesis of cyclic carbonate from carbon dioxide and epoxides under mild conditions using chromium metal complex having salen ligand together with dimethylamino pyridine (DMAP) as the co-catalyst.

Patent document CN 101679343 B discloses the synthesis of cyclic carbonate from carbon dioxide and epoxides under mild conditions using dimeric aluminum(salen) complexes as the catalyst together with tetrabutylammonium bromide as the co-catalyst. It was found to obtain quite high yield percentage of cyclic carbonate.

Punnamchandar Ramidi et al. (Industrial & Engineering Chemistry Research, 2011, 50, 7800-7807) discloses the synthesis of cyclic carbonate from carbon dioxide and epoxides using chromium complex having cyclic amido ligand as the catalyst together with the Lewis basic co-catalyst such as dimethylamino pyridine (DMAP). It was found that the suitable operating conditions for the synthesis of cyclic carbonate with said catalysts was the temperature of 180° C. and the pressure of carbon dioxide of 450 psig. This could synthesize the propylene oxide with yield percentage up to 100%.

Maximilian Tiffner et al. (Chemistry An Asian Journal, 2017, 12, 1048-1051) discloses the synthesis of cyclic carbonate from carbon dioxide and epoxides under mild conditions using metal corrole complex as the catalyst together with tetrabutylammonium bromide as the co-catalyst. It was found that said catalysts have good efficiency in the synthesis of cyclic carbonate under carbon dioxide atmospheric pressure condition.

Mariachiara Cozzolino et al. (Dalton Transactions, 2018, 47, 13229-13238) discloses the synthesis of cyclic carbonate from carbon dioxide and epoxides using iron metal complex containing salen, salan, and salalen ligands as the catalysts together with tetrabutylammonium bromide as the co-catalyst under carbon dioxide atmospheric pressure condition of 20 bars, temperature of 100° C., and operation time for 16 hours. It was found that the iron metal complex containing salan ligand had the best catalytic ability, followed by the salen and salalen ligands, respectively.

Xiang Zhang et al. (Tetrahedron Letters, 2008, 49, 6589-6592) discloses the synthesis of cyclic carbonate from carbon dioxide and epoxides using complex catalytic system comprising the electrophilic center connected to the nucleophilic center under mild conditions. This included the synthesis of cyclic carbonate under non-solvent condition. It was found that said catalyst system could be operated well at the temperature of 80° C. and the carbon dioxide pressure of 300 psi.

Therefore, the present invention aims to prepare the catalyst composition for cyclic carbonate production from $CO_2$ and epoxides under mild conditions, wherein the synthesis of cyclic carbonate can be efficiently catalyzed with good selectivity to cyclic carbonate.

SUMMARY OF THE INVENTIONS

The present invention relates to catalyst composition for cyclic carbonate production from $CO_2$ and epoxides under mild conditions, which can effectively catalyze the cyclic carbonate synthesis and provides good selectivity to cyclic carbonate, wherein said catalyst composition comprising:

a) the metal complex as shown in structure (I):

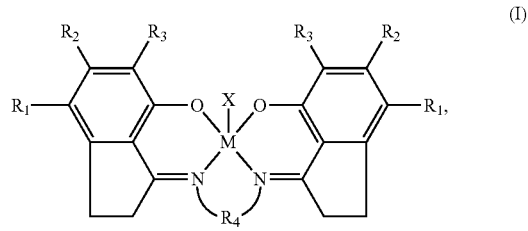

wherein,

M represents transition metal atom;

$R_1$, $R_2$, and $R_3$ represent independent group selected from hydrogen atom, halogen atom, alkyl group, alkenyl group, alkynyl group, alkoxy group, amine group, phenyl group, benzyl group, cyclic hydrocarbon group comprising hetero atom, perfluoroalkyl group, or nitro group;

$R_4$ represents group selected from alkylene group, cycloalkylene group, or phenylene group;

X represents group selected from halogen atom, acetate group, or triflate group; and b) the organic compound as the co-catalyst selected from compound containing nitrogen, compound of quaternary ammonium salts, or compound of iminium salts.

DESCRIPTION OF THE INVENTION

The present invention relates to the catalyst composition for cyclic carbonate production from $CO_2$ and epoxides under mild conditions, wherein the catalyst according to the invention can efficiently catalyze the synthesis of cyclic carbonate with good selectivity to cyclic carbonate, wherein the catalyst according to the invention can be described according to the following embodiments.

Any aspect being described herein also means to include the application to other aspects of this invention unless stated otherwise.

Technical terms or scientific terms used herein have definitions as understood by an ordinary person skilled in the art unless stated otherwise.

Any tools, equipment, methods, or chemicals named herein mean tools, equipment, methods, or chemicals being operated or used commonly by those person skilled in the art unless stated otherwise that they are tools, equipment, methods, or chemicals specific only in this invention.

Use of singular noun or singular pronoun with "comprising" in claims or specification means "one" and also including "one or more", "at least one", and "one or more than one".

All compositions and/or methods disclosed and claims in this application are intended to cover embodiments from any operation, performance, modification, or adjustment any factors without any experiment that significantly different from this invention, and obtain with object with utility and resulted as same as the present embodiment according to person ordinary skilled in the art although without specifically stated in claims. Therefore, substitutable or similar object to the present embodiment, including any minor modification or adjustment that can be apparent to person skilled in the art should be construed as remains in spirit, scope, and concept of invention as appeared in appended claims.

Throughout this application, term "about" means any number that appeared or expressed herein that could be varied or deviated from any error of equipment, method, or personal using said equipment or method.

Hereafter, invention embodiments are shown without any purpose to limit any scope of the invention.

This invention relates to the catalyst composition for cyclic carbonate production from $CO_2$ and epoxides, which can efficiently catalyze the cyclic carbonate synthesis with good selectivity to cyclic carbonate, wherein said catalyst composition comprising:

a) the metal complex as shown in structure (I):

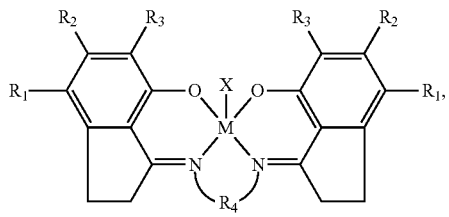

wherein,

M represents transition metal atom;

$R_1$, $R_2$, and $R_3$ represent independent group selected from hydrogen atom, halogen atom, alkyl group, alkenyl group, alkynyl group, alkoxy group, amine group, phenyl group, benzyl group, cyclic hydrocarbon group comprising hetero atom, perfluoroalkyl group, or nitro group;

$R_4$ represents group selected from alkylene group, cycloalkylene group, or phenylene group;

X represents group selected from halogen atom, acetate group, or triflate group; and b) the organic compound as the co-catalyst selected from compound containing nitrogen, compound of quaternary ammonium salts, or compound of iminium salts.

Preferably, in the metal complex in a), M represents transition metal atom selected from chromium, cobalt, or iron. More preferably, M is chromium metal atom.

In one aspect of the invention, in the metal complex in a), $R_1$, $R_2$, and $R_3$ represent independent group selected from hydrogen atom, halogen atom, alkyl group having 1 to 4 carbon atoms, alkenyl group having 1 to 4 carbon atoms, alkynyl group having 1 to 4 carbon atoms, alkoxy group having 1 to 4 carbon atoms, amine group, phenyl group, benzyl group, cyclic hydrocarbon group comprising hetero atom, perfluoroalkyl group, or nitro group.

In one aspect of the invention, in the metal complex in a), $R_1$, $R_2$, and $R_3$ represent independent group selected from, but not limited to hydrogen atom, chlorine atom, methyl group, ethyl group, iso-propyl group, n-butyl group, tert-butyl group, methoxy group, ethoxy group, iso-propoxy group, n-butoxy group, tert-butoxy group, phenyl group, benzyl group, trifluoromethyl group, or nitro group. Preferably, in the metal complex in a), $R_1$ and $R_3$ are tert-butyl group and $R_2$ is hydrogen atom.

In one aspect of the invention, in the metal complex in a), $R_4$ represents group selected from alkylene group having 2 to 3 carbon atoms, cycloalkylene group having 6 carbon atoms, or phenylene group.

In one aspect of the invention, in the metal complex in a), $R_4$ represents group selected from, but not limited to ethylene group, 1,3-propylene group, 1,2-cyclohexylene group, or 1,2-phenylene group. Preferably, in the metal complex in a), $R_4$ represents group selected from ethylene group.

In one aspect of the invention, in the metal complex in a), X represents group selected from, but not limited to chlorine atom, bromine atom, iodine atom, acetate group, or triflate group.

In one aspect of the invention, the metal complex in a) is selected from N—N'-bis(ethylenesalicylidene)-ethane-1,2-diamino metal (III) chloride, N—N'-bis(ethylenesalicylidene)-propane-1,3-diamino metal (III) chloride, N—N'-bis(ethylenesalicylidene)-benzene-1,2-diamino metal (III) chloride, N—N'-bis(ethylenesalicylidene)-cyclohexane-1,2-diamino metal (III) chloride, N—N'-bis(3,5-di-tert-butyl ethylenesalicylidene)-ethane-1,2-diamino metal (III) chloride, N—N'-bis(3,5-dimethyl ethylenesalicylidene)-ethane-1,2-diamino metal (III) chloride, N—N'-bis(3-methyl ethylenesalicylidene)-ethane-1,2-diamino metal (III) chloride, N—N'-bis(5-methyl ethylenesalicylidene)-ethane-1,2-diamino metal (III) chloride, N—N'-bis(3-tert-butyl ethylenesalicylidene)-ethane-1,2-diamino metal (III) chloride, N—N'-bis(5-tert-butyl ethylenesalicylidene)-ethane-1,2-diamino metal (III) chloride, N—N'-bis(3-methyl, 5-tert-butyl ethylenesalicylidene)-ethane-1,2-diamino metal (III) chloride, N—N'-bis(3-tert-butyl, 5-methyl ethylenesalicylidene)-ethane-1,2-diamino metal (III) chloride, N—N'-bis(3-tert-butyl, 5-trifluoromethyl ethylenesalicylidene)-ethane-1,2-diamino metal (III) chloride, N—N'-bis(3-tert-butyl, 5-methoxy ethylenesalicylidene)-ethane-1,2-diamino metal (III) chloride, N—N'-bis(3-tert-butyl, 5-nitro ethylenesalicylidene)-ethane-1,2-diamino metal (III) chloride, N—N'-bis(3-tert-butyl, 5-chloro ethylenesalicylidene)-ethane-1,2-diamino metal (III) chloride, N—N'-bis(3-methyl, 5-trifluoromethyl ethylenesalicylidene)-ethane-1,2-diamino metal (III) chloride, N—N'-bis(3-methyl, 5-methoxy ethylenesalicylidene)-ethane-1,2-diamino metal (III) chloride, N—N'-bis(3-methyl, 5-nitro ethylenesalicylidene)-ethane-1,2-diamino metal (III) chloride, N—N'-bis(3-methyl, 5-chloro ethylenesalicylidene)-ethane-1,2-diamino metal (III) chloride, N—N'-bis(3,5-di-tert-butyl ethylenesalicylidene)-propane-1,3-diamino metal (III) chloride, N—N'-bis(3,5- di-methyl ethylenesalicylidene)-propane-1,3-diamino metal (III) chloride, N—N'-bis(3-methyl ethylenesalicylidene)-propane-1,3-diamino metal (III) chloride, N—N'-bis(5-methyl ethylenesalicylidene)-propane-1,3-diamino metal (III) chloride, N—N'-bis(3-tert-butyl ethylenesalicylidene)-propane-1,3-diamino metal (III) chloride, N—N'-bis(5-tert-butyl ethylenesalicylidene)-propane-1,3-diamino metal (III) chloride, N—N'-bis(3-methyl, 5-tert-butyl ethylenesalicylidene)-propane-1,3-diamino metal (III) chloride, N—N'-bis(3-tert-butyl, 5-methyl ethylenesalicylidene)-propane-1,3-diamino metal (III) chloride, N—N'-bis(3-tert-butyl, 5-trifluoromethyl ethylenesalicylidene)-propane-1,3-diamino metal (III) chloride, N—N'-bis(3-tert-butyl, 5-methoxy ethylenesalicylidene)-propane-1,3-diamino metal (III) chloride, N—N'-bis(3-tert-butyl, 5-nitro ethylenesalicylidene)-propane-1,3-diamino metal (III) chloride, N—N'-bis(3-tert-butyl, 5-chloro ethylenesalicylidene)-propane-1,3-diamino metal (III) chloride, N—N'-bis(3-methyl, 5-trifluoromethyl ethylenesalicylidene)-propane-1,3-diamino metal (III) chloride, N—N'-bis(3-methyl, 5-methoxy ethylenesalicylidene)-propane-1,3-diamino metal (III) chloride, N—N'-bis(3-methyl, 5-nitro ethylenesalicylidene)-propane-1,3-diamino metal (III) chloride, N—N'-bis(3-methyl, 5-chloro ethylenesalicylidene)-propane-1,3-diamino metal (III) chloride, N—N'-bis(3,5-di-tert-butyl ethylenesalicylidene)-benzene-1,2-diamino metal (III) chloride, N—N'-bis(3,5-di-methyl ethylenesalicylidene)-benzene-1,2-diamino metal (III) chloride, N—N'-bis(3-methyl ethylenesalicylidene)-benzene-1,2-diamino metal (III) chloride, N—N'-bis(5-methyl ethylenesalicylidene)-benzene-1,2-diamino metal (III) chloride, N—N'-bis(3-tert-butyl ethylenesalicylidene)-benzene-1,2-diamino metal (III) chloride, N—N'-bis(5-tert-butyl ethylenesalicylidene)-benzene-1,2-diamino metal (III) chloride, N—N'-bis(3-methyl, 5-tert-butyl ethylenesalicylidene)-benzene-1,2-diamino metal (III) chloride, N—N'-bis(3-tert-butyl, 5-methyl ethylenesalicylidene)-benzene-1,2-diamino metal (III) chloride, N—N'-bis(3-tert-butyl, 5-trifluoromethyl ethylenesalicylidene)-benzene-1,2-diamino metal (III) chloride, N—N'-bis(3-tert-butyl, 5-methoxy ethylenesalicylidene)-benzene-1,2-diamino metal (III) chloride, N—N'-bis(3-tert-butyl, 5-nitro ethylenesalicylidene)-benzene-1,2-diamino metal (III) chloride, N—N'-bis(3-tert-butyl, 5-chloro ethylenesalicylidene)-benzene-1,2-diamino metal (III) chloride, N—N'-bis(3-methyl, 5-trifluoromethyl ethylenesalicylidene)-benzene-1,2-diamino metal (III) chloride, N—N'-bis(3-methyl, 5-methoxy ethylenesalicylidene)-benzene-1,2-diamino metal (III) chloride, N—N'-bis(3-methyl, 5-nitro ethylenesalicylidene)-benzene-1,2-diamino metal (III) chloride, N—N'-bis(3-methyl, 5-chloro ethylenesalicylidene)-benzene-1,2-diamino metal (III) chloride, N—N'-bis(3,5-di-tert-butyl ethylenesalicylidene)-cyclohexane-1,2-diamino metal (III) chloride, N—N'-bis(3,5-di-methyl ethylenesalicylidene)-cyclohexane-1,2-diamino metal (III) chloride, N—N'-bis(3-methyl ethylenesalicylidene)-cyclohexane-1,2-diamino metal (III) chloride, N—N'-bis(5-methyl ethylenesalicylidene)-cyclohexane-1,2-diamino metal (III) chloride, N—N'-bis(3-tert-butyl ethylenesalicylidene)-cyclohexane-1,2-diamino metal (III) chloride, N—N'-bis(5-tert-butyl ethylenesalicylidene)-cyclohexane-1,2-diamino metal (III) chloride, N—N'-bis(3-methyl, 5-tert-butyl ethylenesalicylidene)-cyclohexane-1,2-diamino metal (III) chloride, N—N'-bis(3-tert-butyl, 5-methyl ethylenesalicylidene)-cyclohexane-1,2-diamino metal (III) chloride, N—N'-bis(3-tert-butyl, 5-trifluoromethyl ethylenesalicylidene)-cyclohexane-1,2-diamino metal (III) chloride, N—N'-bis(3-tert-butyl, 5-methoxy ethylenesalicylidene)-cyclohexane-1,2-diamino metal (III) chloride, N—N'-bis(3-tert-butyl, 5-nitro ethylenesalicylidene)-cyclohexane-1,2-diamino metal (III) chloride, N—N'-bis(3-tert-butyl, 5-chloro ethylenesalicylidene)-cyclohexane-1,2-diamino metal (III) chloride, N—N'-bis(3-methyl, 5-trifluoromethyl ethylenesalicylidene)-cyclohexane-1,2-diamino metal (III) chloride, N—N'-bis(3-methyl, 5-methoxy ethylenesalicylidene)-cyclohexane-1,2-diamino metal (III) chloride, N—N'-bis(3-methyl, 5-nitro ethylenesalicylidene)-cyclohexane-1,2-diamino metal (III) chloride, or N—N'-bis(3-methyl, 5-chloro ethylenesalicylidene)-cyclohexane-1,2-diamino metal (III) chloride.

In one aspect of the invention, the metal complex in a) can be synthesized from the reaction between metal salt precursor and N—N'-bis(ethylenesalicylidene)-diamine ligand and its derivatives, wherein the mole ratio of the reaction between metal salt and said ligand is in the range of 1:1 to 1:2.

In one aspect of the invention, the chromium metal salt precursor for the invention of the metal complex in a) may be selected from, but not limited to chromium (III) chloride ($CrCl_3$), chromium (III) chloride tetrahydrofuran ($CrCl_3(THF)_3$), chromium (II) chloride ($CrCl_2$), chromium (III) chloride hexahydrate ($CrCl_3 \cdot 6H_2O$), chromium (III) bromide ($CrBr_3$), chromium (III) iodide ($CrI_3$), chromium (III) acetate ($Cr(C_2H_3O_2)_3$), or chromium (III) triflate ($Cr(CF_3SO_3)_3$). Preferably, the chromium metal salt precursor for the invention of the metal complex in a) is selected from chromium (III) chloride tetrahydrofuran ($CrCl_3(THF)_3$) or chromium (II) chloride ($CrCl_2$).

In one aspect of the invention, the cobalt metal salt precursor for the invention of the metal complex in a) may be selected from, but not limited to cobalt (II) chloride ($CoCl_2$), cobalt (II) chloride hexahydrate ($CoCl_2 \cdot 6H_2O$), cobalt (II) bromide ($CoBr_2$), cobalt (II) iodide ($CoI_2$), cobalt (II) acetate ($Co(CH_3CO_2)_2$), or cobalt (II) triflate ($Co(CF_3SO_3)_2$). Preferably, the cobalt metal salt precursor for the invention of the metal complex in a) is selected from cobalt (II) chloride ($CoCl_2$).

In one aspect of the invention, the iron metal salt precursor for the invention of the metal complex in a) may be selected from, but not limited to iron (III) chloride ($FeCl_3$), iron (III) chloride hexahydrate ($FeCl_3 \cdot 6H_2O$), iron (III) bromide ($FeBr_3$), iron (III) iodide ($FeI_3$), iron (III) acetate ($Fe(C_2H_3O_3)_3$), or iron (III) triflate ($Fe(CF_3SO_3)_3$). Preferably, the iron metal salt precursor for the invention of the metal complex in a) is selected from iron (III) chloride ($FeCl_3$).

In one aspect of the invention, the N—N'-bis(ethylenesalicylidene)-diamine ligand and its derivatives is selected from, but not limited to N—N'-bis(ethylenesalicylidene)-ethane-1,2-diamine, N—N'-bis(ethylenesalicylidene)-propane-1,3-diamine, N—N'-bis(ethylenesalicylidene)-benzene-1,2-diamine, N—N'-bis(ethylenesalicylidene)-cyclohexane-1,2-diamine, N—N'-bis(3,5-di-tert-butyl ethylenesalicylidene)-ethane-1,2-diamine, N—N'-bis(3,5-di-methyl ethylenesalicylidene)-ethane-1,2-diamine, N—N'-bis(3-methyl ethylenesalicylidene)-ethane-1,2-diamine, N—N'-bis (5-methyl ethylenesalicylidene)-ethane-1,2-diamine, N—N'-bis(3-tert-butyl ethylenesalicylidene)-ethane-1,2-diamine, N—N'-bis(5-tert-butyl ethylenesalicylidene)-ethane-1,2-diamine, N—N'-bis(3-methyl, 5-tert-butyl ethylenesalicylidene)-ethane-1,2-diamine, N—N'-bis(3-tert-butyl, 5-methyl ethylenesalicylidene)-ethane-1,2-diamine, N—N'-bis(3-tert-butyl, 5-trifluoromethyl ethylenesalicylidene)-ethane-1,2-diamine, N—N'-bis(3-tert-butyl, 5-methoxy ethylenesalicylidene)-ethane-1,2-diamine, N—N'-bis(3-tert-butyl, 5-nitro ethylenesalicylidene)-ethane-1,2-diamine, N—N'-bis(3-tert-butyl, 5-chloro ethylenesalicylidene)-ethane-1,2-diamine, N—N'-bis(3-methyl, 5-trifluoromethyl ethylenesalicylidene)-ethane-1,2-diamine, N—N'-bis(3-methyl, 5-methoxy ethylenesalicylidene)-ethane-1,2-diamine, N—N'-bis(3-methyl, 5-nitro ethylenesalicylidene)-ethane-1,2-diamine, N—N'-bis(3-methyl, 5-chloro ethylenesalicylidene)-ethane-1,2-diamine, N—N'-bis(3,5-di-tert-butyl ethylenesalicylidene)-propane-1,3-diamine, N—N'-bis(3,5-di-methyl ethylenesalicylidene)-propane-1,3-diamine, N—N'-bis(3-methyl ethylenesalicylidene)-propane-1,3-diamine, N—N'-bis(5-methyl ethylenesalicylidene)-propane-1,3-diamine, N—N'-bis(3-tert-butyl ethylenesalicylidene)-propane-1,3-diamine, N—N'-bis(5-tert-butyl ethylenesalicylidene)-propane-1,3-diamine, N—N'-bis(3-methyl, 5-tert-butyl ethylenesalicylidene)-propane-1,3-diamine, N—N'-bis(3-tert-butyl, 5-methyl ethylenesalicylidene)-propane-1,3-diamine, N—N'-bis(3-tert-butyl, 5-trifluoromethyl ethylenesalicylidene)-propane-1,3-diamine, N—N'-bis(3-tert-butyl, 5-methoxy ethylenesalicylidene)-propane-1,3-diamine, N—N'-bis(3-tert-butyl, 5-nitro ethylenesalicylidene)-propane-1,3-diamine, N—N'-bis(3-tert-butyl, 5-chloro ethylenesalicylidene)-propane-1,3-diamine, N—N'-bis(3-methyl, 5-trifluoromethyl ethylenesalicylidene)-propane-1,3-diamine, N—N'-bis(3-methyl, 5-methoxy ethylenesalicylidene)-propane-1,3-diamine, N—N'-bis(3-methyl, 5-nitro ethylenesalicylidene)-propane-1,3-diamine, N—N'-bis(3-methyl, 5-chloro ethylenesalicylidene)-propane-1,3-diamine, N—N'-bis(3,5-di-tert-butyl ethylenesalicylidene)-benzene-1,2-diamine, N—N'-bis(3,5-di-methyl ethylenesalicylidene)-benzene-1,2-diamine, N—N'-bis(3-methyl ethylenesalicylidene)-benzene-1,2-diamine, N—N'-bis(5-methyl ethylenesalicylidene)-benzene-1,2-diamine, N—N'-bis(3-tert-butyl ethylenesalicylidene)-benzene-1,2-diamine, N—N'-bis(5-tert-butyl ethylenesalicylidene)-benzene-1,2-diamine, N—N'-bis(3-methyl, 5-tert-butyl ethylenesalicylidene)-benzene-1,2-diamine, N—N'-bis(3-tert-butyl, 5-methyl ethylenesalicylidene)-benzene-1,2-diamine, N—N'-bis(3-tert-butyl, 5-trifluoromethyl ethylenesalicylidene)-benzene-1,2-diamine, N—N'-bis(3-tert-butyl, 5-methoxy ethylenesalicylidene)-benzene-1,2-diamine, N—N'-bis(3-tert-butyl, 5-nitro ethylenesalicylidene)-benzene-1,2-diamine, N—N'-bis(3-tert-butyl, 5-chloro ethylenesalicylidene)-benzene-1,2-diamine, N—N'-bis(3-methyl, 5-trifluoromethyl ethylenesalicylidene)-benzene-1,2-diamine, N—N'-bis(3 methyl, 5-methoxy ethylenesalicylidene)-benzene-1,2-diamine, N—N'-bis(3-methyl, 5-nitro ethylenesalicylidene)-benzene-1,2-diamine, N—N'-bis(3-methyl, 5-chloro ethylenesalicylidene)-benzene-1,2-diamine, N—N'-bis(3,5-di-tert-butyl ethylenesalicylidene)-cyclohexane-1,2-diamine, N—N'-bis(3,5-di-methyl ethylenesalicylidene)-cyclohexane-1,2-diamine, N—N'-bis(3-methyl ethylenesalicylidene)-cyclohexane-1,2-diamine, N—N'-bis(5-methyl ethylenesalicylidene)-cyclohexane-1,2-diamine, N—N'-bis(3-tert-butyl ethylenesalicylidene)-cyclohexane-1,2-diamine, N—N'-bis(5-tert-butyl ethylenesalicylidene)-cyclohexane-1,2-diamine, N—N'-bis(3-methyl, 5-tert-butyl ethylenesalicylidene)-cyclohexane-1,2-diamine, N—N'-bis(3-tert-butyl, 5-methyl ethylenesalicylidene)-cyclohexane-1,2-diamine, N—N'-bis(3-tert-butyl, 5-trifluoromethyl ethylenesalicylidene)-cyclohexane-1,2-diamine, N—N'-bis(3-tert-butyl, 5-methoxy ethylenesalicylidene)-cyclohexane-1,2-diamine, N—N'-bis(3-tert-butyl, 5-nitro ethylenesalicylidene)-cyclohexane-1,2-diamine, N—N'-bis(3-tert-butyl, 5-chloro ethylenesalicylidene)-cyclohexane-1,2-diamine, N—N'-bis(3-methyl, 5-trifluoromethyl ethylenesalicylidene)-cyclohexane-1,2-diamine, N—N'-bis(3-methyl, 5-methoxy ethylenesalicylidene)-cyclohexane-1,2-diamine, N—N'-bis(3-methyl, 5-nitro ethylenesalicylidene)-cyclohexane-1,2-diamine, or N—N'-bis(3-methyl, 5-chloro ethylenesalicylidene)-cyclohexane-1,2-diamine.

In one aspect of the invention, the organic compound as the co-catalyst in b) is selected from 4-dimethylaminopyridine (DMAP), tetrabutylammonium bromide (TBAB), tetrabutylammonium chloride (TBAC), tetrabutylammonium iodide (TBAI), imidazolium bromide, imidazolium chloride, imidazolium iodide, bis(triphenylphosphine) iminium bromide, bis(triphenylphosphine) iminium chloride, bis(triphenylphosphine) iminium iodide, or mixture thereof.

In another aspect of the invention, this invention relates to the process for cyclic carbonate production from $CO_2$ and epoxides, comprising the contact of $CO_2$ and epoxides to the catalyst composition at the temperature in the range of 50 to 180° C., wherein said catalyst composition is selected from the compositions described above.

In one aspect of the invention, the mole ratio of the metal complex in a) to the organic compound as the co-catalyst in b) is in the range of 1:0.5 to 1:300, the mole ratio of the metal complex in a) to epoxides is in the range of 1:100 to 1:20000 and the $CO_2$ pressure is in the range of 15 to 600 psi.

Preferably, the process for cyclic carbonate production is operated at the temperature in the range of 65 to 150° C., wherein the mole ratio of the metal complex in a) to the organic compound as the co-catalyst in b) is in the range of 1:0.5 to 1:200, the mole ratio of the metal complex in a) to epoxides is in the range of 1:1000 to 1:20000 and the $CO_2$ pressure is in the range of 15 to 300 psi.

In one aspect of the invention, the contact of $CO_2$ and epoxides to the catalyst composition is operated under organic solvent-free condition, wherein the organic compound as the co-catalyst in b) is selected from 4-dimethylaminopyridine, tetrabutylammonium bromide, tetrabutylammonium chloride, tetrabutylammonium iodide, imidazolium bromide, imidazolium chloride, imidazolium iodide, bis(triphenylphosphine) iminium bromide, bis(triphenylphosphine) iminium chloride, bis(triphenylphosphine) iminium iodide, or mixture thereof. Preferably, the organic compound as the co-catalyst in b) is tetrabutylammonium bromide.

In one aspect of the invention, the contact of $CO_2$ and epoxides to the catalyst composition is operated under the presence of organic solvent selected from dichloromethane, hexane, benzene, toluene, dimethylformamide, or mixture thereof. Preferably, the organic solvent is dichloromethane.

In one aspect of the invention, the contact of $CO_2$ and epoxides to the catalyst composition is operated under the presence of organic solvent, wherein the organic compound as the co-catalyst in b) is selected from 4-dimethylaminopyridine, tetrabutylammonium bromide, tetrabutylammonium chloride, tetrabutylammonium iodide, imidazolium bromide, imidazolium chloride, imidazolium iodide, bis(triphenylphosphine) iminium bromide, bis(triphenylphosphine) iminium chloride, bis(triphenylphosphine) iminium iodide, or mixture thereof. Preferably, the organic compound as the co-catalyst in b) is 4-dimethylaminopyridine.

In one aspect of the invention, epoxide is selected from ethylene oxide, propylene oxide, styrene oxide, 1-butene oxide, 1-hexene oxide, cyclohexene oxide, cyclopentene oxide, epichlorohydrin, 3,4-epoxy-1-butene, or 1,2-epoxy-3-phenoxypropane. Preferably, epoxide is epichlorohydrin.

The cyclic carbonate production from $CO_2$ and epoxides according to this invention may further comprise the drying step if necessary, wherein said step may be selected from, but not limited to stir-drying or vacuum drying, etc.

In one aspect, the cyclic carbonate production from $CO_2$ and epoxides according to this invention may be operated in the reactor, but not limited to fixed-bed reactor. The operation may be performed in batch or continuous manner.

The following examples are for demonstrating one aspect of the invention only and not intended to be limitation of the scope of this invention in any way.

Example 1: Synthesis of N—N'-bis(ethylenesalicylidene)-diamine Ligand and its Derivatives to be Used in the Synthesis of Metal Complex Catalyst Containing said Ligand Synthesis of Ligand to be Used in the Synthesis of Catalyst A The solution of 7-hydroxy-1-indanone in ethanol at the concentration of 0.67 M was prepared by dissolving 0.30 g (2 mmol) of 7-hydroxy-1-indanone in 3 mL of ethanol. Then, the 1,2-ethylene diamine was added into said solution. The mole ratio of 7-hydroxy-1-indanone to 1,2-ethylene diamine was 2:1. After that, the acetic acid was added about 1-2 drops. The obtained mixture was stirred while heated until reflux for 48 hours. Then, the obtained mixture was filtered to separate the solid. The obtained solid was washed with 10 mL of diethyl ether for 3 times. The N—N'-bis(ethylenesalicylidene)-ethane-1,2-diamine ligand was obtained as yellow solid.

Synthesis of Ligand to be Used in the Synthesis of Catalyst B

The synthesis of ligand to be used in the synthesis of catalyst B was prepared by the same method as the synthesis of ligand to be used in the synthesis of catalyst A.

Synthesis of Ligand to be Used in the Synthesis of Catalyst C

The solution of 4,6-di-tert-butyl-7-hydroxy-2,3-dihydro-1-indanone in ethanol at the concentration of 0.67 M was prepared by dissolving 0.52 g (2 mmol) of 4,6-di-tert-butyl-7-hydroxy-2,3-dihydro-1-indanone in 3 mL of ethanol. Then, the 1,2-ethylene diamine was added into said solution. The mole ratio of 4,6-di-tert-butyl-7-hydroxy-2,3-dihydro-1-indanone to 1,2-ethylene diamine was 2:1. After that, the acetic acid was added about 1-2 drops. The obtained mixture was stirred while heated until reflux for 48 hours. Then, the obtained mixture was filtered to separate the solid. The obtained solid was washed with 10 mL of diethyl ether for 3 times. The N—N'-bis(3,5-di-tert-butyl ethylenesalicylidene)-ethane-1,2-diamine ligand was obtained as yellow solid.

Example 2: Synthesis of Metal Complex Catalyst Containing N—N'-bis(ethylenesalicylidene)-diamine Ligand and its Derivatives Synthesis of Catalyst A The solution of N—N'-bis(ethylenesalicylidene)-ethane-1,2-diamine ligand in toluene at the concentration of 0.062 M was prepared by dissolving 0.20 g (0.62 mmol) of N—N'-bis(ethylenesalicylidene)-ethane-1,2-diamine ligand in 10 mL of toluene. Then, 0.10 g (0.62 mmol) of iron (III) chloride ($FeCl_3$) and triethylamine were mixed, respectively. The mole ratio of N—N'-bis(ethylenesalicylidene)-ethane-1,2-diamine ligand to iron (III) chloride to triethylamine was 1:1:2. After that, the obtained mixture was stirred and heated at the temperature of 100° C. until reflux under nitrogen atmosphere for 12 hours. The obtained mixture was filtered through celite. Then, the obtained solution was evaporated under vacuum condition. The catalyst A was obtained as red-brown solid.

Synthesis of Catalyst B

The solution of N—N'-bis(ethylenesalicylidene)-ethane-1,2-diamine ligand in tetrahydrofuran at the concentration of 0.031 M was prepared by dissolving 0.10 g (0.31 mmol) of N—N'-bis(ethylenesalicylidene)-ethane-1,2-diamine ligand in 10 mL of tetrahydrofuran. Then, 0.015 g (0.62 mmol) of sodium hydride was mixed into said solution and stirred at room temperature for 1 hour. Then, the obtained mixture was mixed with 0.12 g (0.31 mmol) of chromium (III) chloride tetrahydrofuran ($CrCl_3$ $(THF)_3$). The mole ratio of N—N'-bis(ethylenesalicylidene)-ethane-1,2-diamine ligand to chromium (III) chloride tetrahydrofuran to sodium hydride was 1:1:2. After that, the obtained mixture was stirred at room temperature under nitrogen atmosphere for 12 hours. The obtained mixture was filtered. The obtained solid was washed with saturated sodium chloride solution and water, respectively. Then, the obtained solid was evaporated under vacuum condition. The catalyst B was obtained as light brown solid.

Synthesis of Catalyst C

The solution of N—N'-bis(3,5-di-tert-butyl ethylenesalicylidene)-ethane-1,2-diamine ligand in tetrahydrofuran at the concentration of 0.018 M was prepared by dissolving 0.10 g (0.18 mmol) of N—N'-bis(3,5-di-tert-butyl ethylenesalicylidene)-ethane-1,2-diamine ligand in 10 mL of tetrahydrofuran. Then, 0.0088 g (0.37 mmol) of sodium hydride was mixed into said solution and stirred at room temperature for 1 hour. Then, the obtained mixture was mixed with 0.068 g (0.18 mmol) of chromium (III) chloride tetrahydrofuran ($CrCl_3$ $(THF)_3$). The mole ratio of N—N'-bis(3,5-di-tert-butyl ethylenesalicylidene)-ethane-1,2-diamine ligand to chromium (III) chloride tetrahydrofuran to sodium hydride was 1:1:2. After that, the obtained mixture was stirred at room temperature under nitrogen atmosphere for 12 hours. The obtained mixture was filtered. The obtained solid was washed with saturated sodium chloride solution and water, respectively. Then, the obtained solid was evaporated under vacuum condition. The catalyst C was obtained as light brown solid.

Example 3: Preparation of Cyclic Carbonate from the Reaction Between $CO_2$ and Epoxides The metal complex catalyst containing N—N'-bis(ethylenesalicylidene)-diamine ligand and its derivatives according to the invention which are catalyst A, B, and C will be tested for the ability in cyclic carbonate production from the reaction between CO₂ and epoxides in order to compare with the comparative catalysts which are the metal complex REFCAT1, REFCAT2, and REFCAT3, which are N,N'-bis (salicylidene)ethylenediaminoiron (III) chloride, N,N'-bis(3, 5-di-tert-butylsaliylidene)-1,2-diphenylethylenedi-aminochromium (III) chloride, and N,N'-bis(3,5-di-tert-butylsalicylidene)-pyrrolidine-diaminochromium (III) chloride, respectively.

Testing for the Ability in Cyclic Carbonate Production of the Catalyst according to the Invention under the Presence of Organic Solvent Testing for the ability in cyclic carbonate production under the presence of organic solvent of the metal complex catalyst containing N—N'-bis(ethylenesalicylidene)-diamine ligand and its derivatives according to the invention can be performed according to the following process.

The 0.02 mmol of metal complex catalyst, 0.02 mmol of organic compound as the co-catalyst, 26.66 mmol of epoxides, and 0.25 to 1 mL of organic solvent were added into the reactor. Then, CO₂ was added into the reactor at the pressure of 100 psi. The reactor was heated at the temperature of 65 to 110° C. for 1 to 24 hours. After the set time had been reached, the temperature of the reactor was reduced to room temperature. The obtained product was cyclic carbonate which would be identified by NMR spectrometry technique.

Testing for the Ability in Cyclic Carbonate Production of the Catalyst according to the Invention under Organic Solvent-Free Condition Testing for the ability in cyclic carbonate production under organic solvent-free condition of the metal complex catalyst containing N—N'-bis(ethylenesalicylidene)-diamine ligand and its derivatives according to the invention can be performed according to the following process.

The 0.02 mmol of metal complex catalyst, 0.06 to 4 mmol of organic compound as the co-catalyst, and 100 to 400 mmol of epoxides were added into the reactor. Then, CO₂ was added into the reactor at the pressure of 300 psi. The reactor was heated at the temperature of 80 to 120° C. for 0.25 to 6 hours. After the set time had been reached, the temperature of the reactor was reduced to room temperature. The obtained product was cyclic carbonate which would be identified by NMR spectrometry technique.

Testing for the Ability in Cyclic Carbonate Production under Metal Complex Catalyst-Free and Organic Solvent-Free Condition Testing for the ability in cyclic carbonate production under metal complex catalyst-free and organic solvent-free condition can be performed according to the same process as the testing for the ability in cyclic carbonate production under organic solvent-free condition, except the addition of metal complex catalyst.

Structure of the Catalyst According to the Invention

The structure of the synthesized metal complex catalyst containing N—N'-bis(ethylenesalicylidene)-diamine ligand and its derivatives is shown in table 1.

TABLE 1

Structure of the metal complex catalyst containing N-N'-bis(ethylenesalicylidene)-diamine ligand and its derivatives according to the invention

| Sample | Name | Structure |
|---|---|---|
| Catalyst A | N-N'-bis(ethylenesalicylidene)-ethane-1,2-diaminoiron (III) chloride | |
| Catalyst B | N-N'-bis(ethylenesalicylidene)-ethane-1,2-diaminochromium (III) chloride | |
| Catalyst C | N-N'-bis(3,5-di-tert-butyl ethylenesalicylidene)-ethane-1,2-diaminochromuin (III) chloride | |

Structure of the Comparative Catalyst

The comparative catalyst REFCAT1, REFCAT2, and REFCAT3 were N,N'-bis(salicylidene)ethylenediaminoiron (III) chloride, N,N'-bis(3,5-di-tert-butylsalicylidene)-1,2-diphenylethylenediaminochromium (III) chloride, and N,N'-bis(3,5-di-tert-butylsalicylidene)-pyrrolidine-diaminochromium (III) chloride, respectively. The comparative catalyst REFCAT1 was synthesized according to the steps disclosed in Dalton Transactions, 2018, 47, 13229-13238, except the use of toluene instead of methanol in the synthesis. This synthesized catalyst REFCAT1 was tested for the ability in cyclic carbonate production by the same process as the catalyst according to the invention. While the comparative catalyst REFCAT2 and REFCAT3 were the catalysts disclosed before in Journal of the American Chemical Society, 2001, 123, 11498-11499 and Tetrahedron Letters, 2008, 49, 6589-6592, respectively. The structure of three comparative catalysts is shown in table 2.

TABLE 2

Structure of the comparative catalysts

| Sample | Name | Structure |
|---|---|---|
| Catalyst REFCAT1 | N-N'-bis(salicylidene)ethylenediaminoiron (III) chloride | 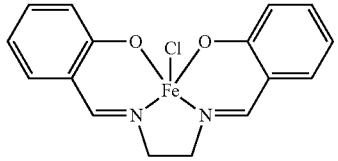 |
| Catalyst REFCAT2 | N-N'-bis(3,5-di-tert-butylsalicylidene)-1,2-diphenylethylenediaminochromium (III) chloride | 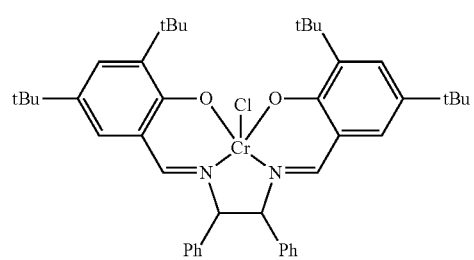 |
| Catalyst REFCAT3 | N-N'-bis(3,5-di-tert-butylsalicylidene)-pyrrolidine-diaminochromium (III) chloride | 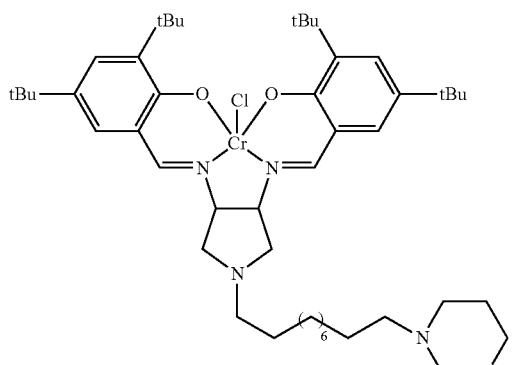 |

Cyclic Carbonate Formation

The catalytic ability for the cyclic carbonate formation from the reaction between $CO_2$ and epoxides of the metal complex catalyst containing N—N'-bis(ethylenesalicylidene)-diamine ligand and its derivatives according to the invention which are catalyst A, B, and C comparing to the catalytic ability for the cyclic carbonate formation of the comparative catalyst REFCAT1, REFCAT2, and REFCAT3 is shown in table 3. It was found that the catalyst according to the invention had better catalytic ability for the cyclic carbonate formation than the comparative catalyst REFCAT1, REFCAT2, and REFCAT3, wherein the yield percentage of cyclic carbonate is higher with shorter time. This shows that the catalyst according to the invention had better catalytic ability for the cyclic carbonate formation than those three comparative catalysts. Moreover, the synthesis process of the catalyst according to this invention is easier and cheaper comparing to the comparative catalyst REFCAT3.

TABLE 3

Catalytic ability for the cyclic carbonate formation of the metal complex catalyst containing N-N'-bis(ethylenesalicylidene)-diamine ligand and its derivatives according to the invention comparing to the comparative catalyst

| Catalyst system | | | | Time (hr) | Temperature (° C.) | $CO_2$ pressure (psi) | Mole ratio of catalyst:co-catalyst:epoxides | Cyclic percentage carbonate yield (% Yield) | TOF[a] ($h^{-1}$) |
|---|---|---|---|---|---|---|---|---|---|
| Catalyst | Co-catalyst | Epoxides | Solvent | | | | | | |
| REFCAT1 | DMAP | propylene oxide | DCM | 24 | 65 | 100 | 1:1:1333 | 42 | 23 |
| A | DMAP | propylene oxide | DCM | 24 | 65 | 100 | 1:1:1333 | 88 | 49 |
| A | TBAB | propylene oxide | DCM | 24 | 65 | 100 | 1:1:1333 | 54 | 30 |

TABLE 3-continued

Catalytic ability for the cyclic carbonate formation of the metal complex catalyst containing N-N'-bis(ethylenesalicylidene)-diamine ligand and its derivatives according to the invention comparing to the comparative catalyst

| Catalyst system | | | | Time (hr) | Temperature (° C.) | $CO_2$ pressure (psi) | Mole ratio of catalyst:co-catalyst:epoxides | Cyclic carbonate yield (% Yield) | TOF$^a$ (h$^{-1}$) |
|---|---|---|---|---|---|---|---|---|---|
| Catalyst | Co-catalyst | Epoxides | Solvent | | | | | | |
| B | DMAP | propylene oxide | DCM | 6 | 65 | 100 | 1:1:1333 | 93 | 207 |
| B | TBAB | propylene oxide | DCM | 6 | 65 | 100 | 1:1:1333 | 69 | 153 |
| REFCAT2$^b$ | DMAP | propylene oxide | DCM | 1 | 100 | 100 | 1:1:1333 | 69 | 916 |
| B | DMAP | propylene oxide | DCM | 1 | 110 | 100 | 1:1:1333 | 92 | 1222 |
| C | DMAP | propylene oxide | DCM | 1 | 110 | 100 | 1:1:1333 | 88 | 1180 |
| REFCAT3$^c$ | — | propylene oxide | neat | 1 | 80 | 300 | 1:0:5000 | 39 | 1936 |
| C | TBAB | propylene oxide | neat | 1 | 80 | 300 | 1:3:5000 | 66 | 3300 |
| C | TBAB | propylene oxide | neat | 1 | 80 | 300 | 1:5:5000 | 76 | 3800 |
| C | TBAB | propylene oxide | neat | 1 | 80 | 300 | 1:10:5000 | 86 | 4300 |
| — | TBAB | propylene oxide | neat | 1 | 80 | 300 | 0:5:5000 | 1 | 65 |
| C | TBAB | propylene oxide | neat | 1 | 80 | 300 | 1:50:10000 | 81 | 8100 |
| C | TBAB | propylene oxide | neat | 1 | 80 | 300 | 1:100:20000 | 46 | 9200 |
| C | TBAB | propylene oxide | neat | 1 | 80 | 300 | 1:200:20000 | 58 | 11600 |
| C | TBAB | propylene oxide | neat | 1 | 100 | 300 | 1:200:20000 | 78 | 15600 |
| C | TBAB | propylene oxide | neat | 1 | 120 | 300 | 1:200:20000 | 83 | 16600 | neat is solvent-free, DCM is dichloromethane
$^a$amount of product formed per catalyst per time
$^b$operating condition: 0.042 mmol of catalyst, 0.042 mmol of co-catalyst, 57.2 mmol of epoxides, 0.5 mL of solvent
$^c$operating condition: 0.04 mmol of catalyst, 200 mmol of epoxides

TABLE 4

Catalytic ability for the cyclic carbonate formation from different epoxides using catalyst C under solvent-free condition, mole ratio of catalyst:co-catalyst(TBAB):epoxides at 1:50:5000, $CO_2$ pressure of 300 psi, temperature of 80° C.

| Epoxides | Time (hr) | Conversion percentage$^a$ (% conversion) | TOF$^b$(h$^{-1}$) | % selectivity to carbonate$^c$ | % selectivity to polycarbonate$^c$ |
|---|---|---|---|---|---|
| 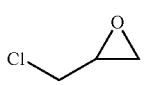 | 0.25 | 83 | 16600 | 100 | 0 |
| 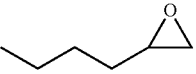 | 1 | 78 | 3900 | 100 | 0 |
| 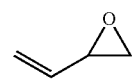 | 1 | 65 | 3250 | 100 | 0 |
| 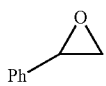 | 1 | 55 | 2750 | 100 | 0 |

TABLE 4-continued

Catalytic ability for the cyclic carbonate formation from different epoxides using catalyst C under solvent-free condition, mole ratio of catalyst:co-catalyst(TBAB):epoxides at 1:50:5000, $CO_2$ pressure of 300 psi, temperature of 80° C.

| Epoxides | Time (hr) | Conversion percentage[a] (% conversion) | TOF[b]($h^{-1}$) | % selectivity to carbonate[c] | % selectivity to polycarbonate[c] |
|---|---|---|---|---|---|
| 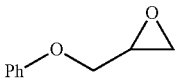 | 0.25 | 50 | 10000 | 100 | 0 |
|  | 6 | 50 | 417 | 100 | 0 |

[a]calculated from epoxides in the mixture at before and after reaction using $^1$H NMR spectroscopy
[b]amount of product formed per catalyst per time
[c]calculated from product formed using $^1$H NMR spectroscopy

BEST MODE OR PREFERRED EMBODIMENT OF THE INVENTION

Best mode or preferred embodiment of the invention is as provided in the description of the invention.

The invention claimed is:

1. A catalyst composition for cyclic carbonate production from $CO_2$ and epoxides, wherein said catalyst composition comprises:
   a) the metal complex as shown in structure (I):

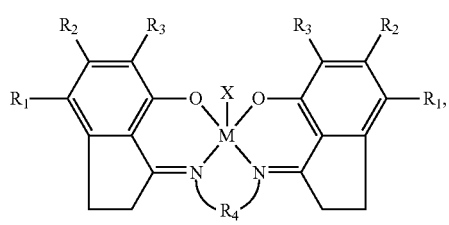

wherein,
M represents transition metal atom selected from the group consisting of chromium, cobalt and iron;
$R_1$, $R_2$, and $R_3$ represent independent group selected from hydrogen atom, halogen atom, alkyl group, alkenyl group, alkynyl group, alkoxy group, amine group, phenyl group, benzyl group, cyclic hydrocarbon group comprising hetero atom, perfluoroalkyl group, or nitro group;
$R_4$ represents group selected from alkylene group, cycloalkylene group, or phenylene group;
X represents group selected from halogen atom, acetate group, or triflate group; and
b) the organic compound as the co-catalyst is selected from the group consisting of 4-dimethylaminopyridine (DMAP), tetrabutylammonium bromide (TBAB), tetrabutylammonium chloride (TBAC), tetrabutylammonium iodide (TBAI), imidazolium bromide, imidazolium chloride, imidazolium iodide, bis(triphenylphosphine) iminium bromide, bis(triphenylphosphine) iminium chloride, bis(triphenylphosphine) iminium iodide, and mixtures thereof.

2. The catalyst composition according to claim 1, wherein in the metal complex in a), M is chromium metal atom.

3. The catalyst composition according to claim 1, wherein in the metal complex in a), $R_1$, $R_2$, and $R_3$ represent independent group selected from hydrogen atom, halogen atom, alkyl group having 1 to 4 carbon atoms, alkenyl group having 1 to 4 carbon atoms, alkynyl group having 1 to 4 carbon atoms, alkoxy group having 1 to 4 carbon atoms, amine group, phenyl group, benzyl group, cyclic hydrocarbon group comprising hetero atom, perfluoroalkyl group, or nitro group.

4. The catalyst composition according to claim 1 or 3, wherein in the metal complex in a), $R_1$, $R_2$, and $R_3$ represent independent group selected from hydrogen atom, chlorine atom, methyl group, ethyl group, iso-propyl group, n-butyl group, tert-butyl group, methoxy group, ethoxy group, iso-propoxy group, n-butoxy group, tert-butoxy group, phenyl group, benzyl group, trifluoromethyl group, or nitro group.

5. The catalyst composition according to claim 4, wherein in the metal complex in a), $R_1$ and $R_3$ are tert-butyl group and $R_2$ is hydrogen atom.

6. The catalyst composition according to claim 1, wherein in the metal complex in a), $R_4$ represents group selected from alkylene group having 2 to 3 carbon atoms, cycloalkylene group having 6 carbon atoms, or phenylene group.

7. The catalyst composition according to claim 1 or 6, wherein in the metal complex in a), $R_4$ represents group selected from ethylene group, 1,3-propylene group, 1,2-cyclohexylene group, or 1,2-phenylene group.

8. The catalyst composition according to claim 7, wherein in the metal complex in a), $R_4$ is ethylene group.

9. The catalyst composition according to claim 1, wherein in the metal complex in a), X represents group selected from chlorine atom, bromine atom, iodine atom, acetate group, or triflate group.

10. The catalyst composition according to claim 1, wherein the metal complex in a) is selected from N—N'-bis(ethylenesalicylidene)-ethane-1,2-diamino metal (III) chloride, N—N'-bis(ethylenesalicylidene)-propane-1,3-diamino metal (III) chloride, N—N'-bis(ethylenesalicylidene)-benzene-1,2-diamino metal (III) chloride, N—N'-bis(ethylenesalicylidene)-cyclohexane-1,2-diamino metal (III) chloride, N—N'-bis(3,5-di-tert-butyl ethylenesalicylidene)-ethane-1,2-diamino metal (III) chloride, N—N'-bis(3,5-di-methyl ethylenesalicylidene)-ethane-1,2-diamino metal (III) chloride, N—N'-bis(3-methyl ethylenesalicylidene)-ethane-1,2-diamino metal (III) chloride, N—N'-bis(5-methyl ethylenesalicylidene)-ethane-1,2-diamino metal (III) chloride, N—N'-bis(3-tert-butyl ethylenesalicylidene)-ethane-1,2-diamino metal (III) chloride, N—N'-bis(5-tert-butyl ethylenesalicylidene)-ethane-1,2-diamino metal (III) chloride, N—N'-bis(3-methyl, 5-tert-butyl ethylenesalicylidene)-ethane-1,2-diamino metal (III) chloride, N—N'-bis(3-tert-butyl, 5-methyl ethylenesalicylidene)-ethane-1,2-diamino metal (III) chloride, N—N'-bis(3-tert-butyl, 5-trifluoromethyl ethylenesalicylidene)-ethane-1,2-diamino metal (III) chloride, N—N'-bis(3-tert-butyl, 5-methoxy ethylenesalicylidene)-ethane-1,2-diamino metal (III) chloride, N—N'-bis(3-tert-butyl, 5-nitro ethylenesalicylidene)-ethane-1,2-diamino metal (III) chloride, N—N'-bis(3-tert-butyl, 5-chloro ethylenesalicylidene)-ethane-1,2-diamino metal (III) chloride, N—N'-bis(3-methyl, 5-trifluoromethyl ethylenesalicylidene)-ethane-1,2-diamino metal (III) chloride, N—N'-bis(3-methyl, 5-methoxy ethylenesalicylidene)-ethane-1,2-diamino metal (III) chloride, N—N'-bis(3-methyl, 5-nitro ethylenesalicylidene)-ethane-1,2-diamino metal (III) chloride, N—N'-bis(3-methyl, 5-chloro ethylenesalicylidene)-ethane-1,2-diamino metal (III) chloride, N—N'-bis(3,5-di-tert-butyl ethylenesalicylidene)-propane-1,3-diamino metal (III) chloride, N—N'-bis(3,5-di-methyl ethylenesalicylidene)-propane-1,3-diamino metal (III) chloride, N—N'-bis(3-methyl ethylenesalicylidene)-propane-1,3-diamino metal (III) chloride, N—N'-bis(5-methyl ethylenesalicylidene)-propane-1,3-diamino metal (III) chloride, N—N'-bis(3-tert-butyl ethylenesalicylidene)-propane-1,3-diamino metal (III) chloride, N—N'-bis(5-tert-butyl ethylenesalicylidene)-propane-1,3-diamino metal (III) chloride, N—N'-bis(3-methyl, 5-tert-butyl ethylenesalicylidene)-propane-1,3-diamino metal (III) chloride, N—N'-bis(3-tert-butyl, 5-methyl ethylenesalicylidene)-propane-1,3-diamino metal chloride, N—N'-bis(3-tert-butyl, 5-trifluoromethyl ethylenesalicylidene)-propane-1,3-diamino metal (III) chloride, N—N'-bis(3-tert-butyl, 5-methoxy ethylenesalicylidene)-propane-1,3-diamino metal (III) chloride, N—N'-bis(3-tert-butyl, 5-nitro ethylenesalicylidene)-propane-1,3-diamino metal (III) chloride, N—N'-bis(3-tert-butyl, 5-chloro ethylenesalicylidene)-propane-1,3-diamino metal (III) chloride, N—N'-bis(3-methyl, 5-trifluoromethyl ethylenesalicylidene)-propane-1,3-diamino metal (III) chloride, N—N'-bis(3-methyl, 5-methoxy ethylenesalicylidene)-propane-1,3-diamino metal (III) chloride, N—N'-bis(3-methyl, 5-nitro ethylenesalicylidene)-propane-1,3-diamino metal (III) chloride, N—N'-bis(3-methyl, 5-chloro ethylenesalicylidene)-propane-1,3-diamino metal (III) chloride, N—N'-bis(3,5-di-tert-butyl ethylenesalicylidene)-benzene-1,2-diamino metal (III) chloride, N—N'-bis(3,5-di-methyl ethylenesalicylidene)-benzene-1,2-diamino metal (III) chloride, N—N'-bis(3-methyl ethylenesalicylidene)-benzene-1,2-diamino metal (III) chloride, N—N'-bis(5-methyl ethylenesalicylidene)-benzene-1,2-diamino metal (III) chloride, N—N'-bis(3-tert-butyl ethylenesalicylidene)-benzene-1,2-diamino metal (III) chloride, N—N'-bis(5-tert-butyl ethylenesalicylidene)-benzene-1,2-diamino metal (III) chloride, N—N'-bis(3-methyl, 5-tert-butyl ethylenesalicylidene)-benzene-1,2-diamino metal (III) chloride, N—N'-bis(3-tert-butyl, 5-methyl ethylenesalicylidene)-benzene-1,2-diamino metal (III) chloride, N—N'-bis(3-tert-butyl, 5-trifluoromethyl ethylenesalicylidene)-benzene-1,2-diamino metal (III) chloride, N—N'-bis(3-tert-butyl, 5-methoxy ethylenesalicylidene)-benzene-1,2-diamino metal (III) chloride, N—N'-bis(3-tert-butyl, 5-nitro ethylenesalicylidene)-benzene-1,2-diamino metal (III) chloride, N—N'-bis(3-tert-butyl, 5-chloro ethylenesalicylidene)-benzene-1,2-diamino metal (III) chloride, N—N'-bis(3-methyl, 5-trifluoromethyl ethylenesalicylidene)-benzene-1,2-diamino metal (III) chloride, N—N'-bis(3-methyl, 5-methoxy ethylenesalicylidene)-benzene-1,2-diamino metal (III) chloride, N—N'-bis(3-methyl, 5-nitro ethylenesalicylidene)-benzene-1,2-diamino metal (III) chloride, N—N'-bis(3-methyl, 5-chloro ethylenesalicylidene)-benzene-1,2-diamino metal (III) chloride, N—N'-bis(3,5-di-tert-butyl ethylenesalicylidene)-cyclohexane-1,2-diamino metal (III) chloride, N—N'-bis(3,5-di-methyl ethylenesalicylidene)-cyclohexane-1,2-diamino metal (III) chloride, N—N'-bis(3-methyl ethylenesalicylidene)-cyclohexane-1,2-diamino metal (III) chloride, N—N'-bis(5-methyl ethylenesalicylidene)-cyclohexane-1,2-diamino metal (III) chloride, N—N'-bis(3-tert-butyl ethylenesalicylidene)-cyclohexane-1,2-diamino metal (III) chloride, N—N'-bis(5-tert-butyl ethylenesalicylidene)-cyclohexane-1,2-diamino metal (III) chloride, N—N'-bis(3-methyl, 5-tert-butyl ethylenesalicylidene)-cyclohexane-1,2-diamino metal (III) chloride, N—N'-bis(3-tert-butyl, 5-methyl ethylenesalicylidene)-cyclohexane-1,2-diamino metal (III) chloride, N—N'-bis(3-tert-butyl, 5-trifluoromethyl ethylenesalicylidene)-cyclohexane-1,2-diamino metal (III) chloride, N—N'-bis(3-tert-butyl, 5-methoxy ethylenesalicylidene)-cyclohexane-1,2-diamino metal (III) chloride, N—N'-bis(3-tert-butyl, 5-nitro ethylenesalicylidene)-cyclohexane-1,2-diamino metal (III) chloride, N—N'-bis(3-tert-butyl, 5-chloro ethylenesalicylidene)-cyclohexane-1,2-diamino metal (III) chloride, N—N'-bis(3-methyl, 5-trifluoromethyl ethylenesalicylidene)-cyclohexane-1,2-diamino metal (III) chloride, N—N'-bis(3-methyl, 5-methoxy ethylenesalicylidene)-cyclohexane-1,2-diamino metal (III) chloride, N—N'-bis(3-methyl, 5-nitro ethylenesalicylidene)-cyclohexane-1,2-diamino metal (III) chloride, or N—N'-bis(3-methyl, 5-chloro ethylenesalicylidene)-cyclohexane-1,2-diamino metal (III) chloride.

11. A process for cyclic carbonate production from $CO_2$ and epoxides, comprising the contact of $CO_2$ and epoxides to the catalyst composition at the temperature in the range of 50 to 180° C., wherein said catalyst composition comprises:
   a) the metal complex as shown in structure (I):

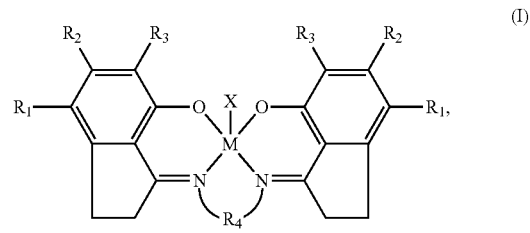

wherein,

M represents transition metal atom selected from the group consisting of chromium, cobalt and iron;

$R_1$, $R_2$, and $R_3$ represent independent group selected from hydrogen atom, halogen atom, alkyl group, alkenyl group, alkynyl group, alkoxy group, amine group, phenyl group, benzyl group, cyclic hydrocarbon group comprising hetero atom, perfluoroalkyl group, or nitro group;

$R_4$ represents group selected from alkylene group, cycloalkylene group, or phenylene group;

X represents group selected from halogen atom, acetate group, or triflate group; and b) the organic compound as the co-catalyst is selected from the group consisting of 4-dimethylaminopyridine (DMAP), tetrabutylammonium bromide (TBAB), tetrabutylammonium chloride (TBAC), tetrabutylammonium iodide (TBAI), imidazolium bromide, imidazolium chloride, imidazolium iodide, bis(triphenylphosphine) iminium bromide, bis(triphenylphosphine) iminium chloride, bis(triphenylphosphine) iminium iodide, and mixtures thereof.

12. The process for cyclic carbonate production according to claim 11, wherein in the metal complex in a), M is chromium metal atom.

13. The process for cyclic carbonate production according to claim 11, wherein in the metal complex in a), $R_1$, $R_2$, and $R_3$ represent independent group selected from hydrogen atom, halogen atom, alkyl group having 1 to 4 carbon atoms, alkenyl group having 1 to 4 carbon atoms, alkynyl group having 1 to 4 carbon atoms, alkoxy group having 1 to 4 carbon atoms, amine group, phenyl group, benzyl group, cyclic hydrocarbon group comprising hetero atom, perfluoroalkyl group, or nitro group.

14. The process for cyclic carbonate production according to claim 11 or 13, wherein in the metal complex in a), $R_1$, $R_2$, and $R_3$ represent independent group selected from hydrogen atom, chlorine atom, methyl group, ethyl group, iso-propyl group, n-butyl group, tert-butyl group, methoxy group, ethoxy group, iso-propoxy group, n-butoxy group, tert-butoxy group, phenyl group, benzyl group, trifluoromethyl group, or nitro group.

15. The process for cyclic carbonate production according to claim 14, wherein in the metal complex in a), $R_1$ and $R_3$ are tert-butyl group and $R_2$ is hydrogen atom.

16. The process for cyclic carbonate production according to claim 11, wherein in the metal complex in a), $R_4$ represents group selected from alkylene group having 2 to 3 carbon atoms, cycloalkylene group having 6 carbon atoms, or phenylene group.

17. The process for cyclic carbonate production according to claim 11 or 16, wherein in the metal complex in a), $R_4$ represents group selected from ethylene group, 1,3-propylene group, 1,2-cyclohexylene group, or 1,2-phenylene group.

18. The process for cyclic carbonate production according to claim 17, wherein in the metal complex in a), $R_4$ is ethylene group.

19. The process for cyclic carbonate production according to claim 11, wherein in the metal complex in a), X represents group selected from chlorine atom, bromine atom, iodine atom, acetate group, or triflate group.

20. The process for cyclic carbonate production according to claim 11, wherein the metal complex in a) is selected from N—N'-bis(ethylenesalicylidene)-ethane-1,2-diamino metal (III) chloride, N—N'-bis(ethylenesalicylidene)-propane-1,3-diamino metal (III) chloride, N—N'-bis(ethylenesalicylidene)-benzene-1,2-diamino metal (III) chloride, N—N'-bis(ethylenesalicylidene)-cyclohexane-1,2-diamino metal (III) chloride, N—N'-bis(3,5-di-tert-butyl ethylenesalicylidene)-ethane-1,2-diamino metal (III) chloride, N—N'-bis(3,5-di-methyl ethylenesalicylidene)-ethane-1,2-diamino metal (III) chloride, N—N'-bis(3-methyl ethylenesalicylidene)-ethane-1,2-diamino metal (III) chloride, N—N'-bis(5-methyl ethylenesalicylidene)-ethane-1,2-diamino metal (III) chloride, N—N'-bis(3-tert-butyl ethylenesalicylidene)-ethane-1,2-diamino metal (III) chloride, N—N'-bis(5-tert-butyl ethylenesalicylidene)-ethane-1,2-diamino metal (III) chloride, N—N'-bis(3-methyl, 5-tert-butyl ethylenesalicylidene)-ethane-1,2-diamino metal (III) chloride, N—N'-bis(3-tert-butyl, 5-methyl ethylenesalicylidene)-ethane-1,2-diamino metal (III) chloride, N—N'-bis(3-tert-butyl, 5-trifluoromethyl ethylenesalicylidene)-ethane-1,2-diamino metal (III) chloride, N—N'-bis(3-tert-butyl, 5-methoxy ethylenesalicylidene)-ethane-1,2-diamino metal (III) chloride, N—N'-bis(3-tert-butyl, 5-nitro ethylenesalicylidene)-ethane-1,2-diamino metal (III) chloride, N—N'-bis(3-tert-butyl, 5-chloro ethylenesalicylidene)-ethane-1,2-diamino metal (III) chloride, N—N'-bis(3-methyl, 5-trifluoromethyl ethylenesalicylidene)-ethane-1,2-diamino metal (III) chloride, N—N'-bis(3-methyl, 5-methoxy ethylenesalicylidene)-ethane-1,2-diamino metal (III) chloride, N—N'-bis(3-methyl, 5-nitro ethylenesalicylidene)-ethane-1,2-diamino metal (III) chloride, N—N'-bis(3-methyl, 5-chloro ethylenesalicylidene)-ethane-1,2-diamino metal (III) chloride, N—N'-bis(3,5-di-tert-butyl ethylenesalicylidene)-propane-1,3-diamino metal (III) chloride, N—N'-bis(3,5-di-methyl ethylenesalicylidene)-propane-1,3-diamino metal (III) chloride, N—N'-bis(3-methyl ethylenesalicylidene)-propane-1,3-diamino metal (III) chloride, N—N'-bis(5-methyl ethylenesalicylidene)-propane-1,3-diamino metal (III) chloride, N—N'-bis(3-tert-butyl ethylenesalicylidene)-propane-1,3-diamino metal (III) chloride, N—N'-bis(5-tert-butyl ethylenesalicylidene)-propane-1,3-diamino metal (III) chloride, N—N'-bis(3-methyl, 5-tert-butyl ethylenesalicylidene)-propane-1,3-diamino metal (III) chloride, N—N'-bis(3-tert-butyl, 5-methyl ethylenesalicylidene)-propane-1,3-diamino metal (III) chloride, N—N'-bis(3-tert-butyl, 5-trifluoromethyl ethylenesalicylidene)-propane-1,3-diamino metal (III) chloride, N—N'-bis(3-tert-butyl, 5-methoxy ethylenesalicylidene)-propane-1,3-diamino metal (III) chloride, N—N'-bis(3-tert-butyl, 5-nitro ethylenesalicylidene)-propane-1,3-diamino metal (III) chloride, N—N'-bis(3-tert-butyl, 5-chloro ethylenesalicylidene)-propane-1,3-diamino metal (III) chloride, N—N'-bis(3-methyl, 5-trifluoromethyl ethylenesalicylidene)-propane-1,3-diamino metal (III) chloride, N—N'-bis(3-methyl, 5-methoxy ethylenesalicylidene)-propane-1,3-diamino metal (III) chloride, N—N'-bis(3-methyl, 5-nitro ethylenesalicylidene)-propane-1,3-diamino metal (III) chloride, N—N'-bis(3-methyl, 5-chloro ethylenesalicylidene)-propane-1,3-diamino metal (III) chloride, N—N'-bis(3,5-di-tert-butyl ethylenesalicylidene)-benzene-1,2-diamino metal (III) chloride, N—N'-bis(3,5-di-methyl ethylenesalicylidene)-benzene-1,2-diamino metal (III) chloride, N—N'-bis(3-methyl ethylenesalicylidene)-benzene-1,2-diamino metal (III) chloride, N—N'-bis(5-methyl ethylenesalicylidene)-benzene-1, 2-diamino metal (III) chloride, N—N'-bis(3-tert-butyl ethylenesalicylidene)-benzene-1,2-diamino metal (III) chloride, N—N'-bis(5-tert-butyl ethylenesalicylidene)-benzene-1,2-diamino metal (III) chloride, N—N'-bis(3-methyl, 5-tert-butyl ethylenesalicylidene)-benzene-1,2-diamino metal (III) chloride, N—N'-bis(3-tert-butyl, 5-methyl ethylenesalicylidene)-benzene-1,2-diamino metal (III) chloride, N—N'-bis(3-tert-butyl, 5-trifluoromethyl ethylenesalicylidene)-benzene-1,2-diamino metal (III) chloride, N—N'-bis(3-tert-butyl, 5-methoxy ethylenesalicylidene)-benzene-1,2-diamino metal (III) chloride, N—N'-bis(3-tert-butyl, 5-nitro ethylenesalicylidene)-benzene-1,2-diamino metal (III) chloride, N—N'-bis(3-tert-butyl, 5-chloro ethylenesalicylidene)-benzene-1,2-diamino metal (III) chloride, N—N'-bis(3-methyl, 5-trifluoromethyl ethylenesalicylidene)-benzene-1,2-diamino metal (III) chloride, N—N'-bis(3-methyl, 5-methoxy ethylenesalicylidene)-benzene-1,2-diamino metal (III) chloride, N—N'-bis(3-methyl, 5-nitro ethylenesalicylidene)-benzene-1,2-diamino metal (III) chloride, N—N'-bis(3-methyl, 5-chloro ethylenesalicylidene)-benzene-1,2-diamino metal (III) chloride, N—N'-bis(3,5-di-tert-butyl ethylenesalicylidene)-cyclohexane-1,2-diamino metal (III) chloride, N—N'-bis(3,5-di-methyl ethylenesalicylidene)-cyclohexane-1,2-diamino metal (III) chloride, N—N'-bis(3-methyl ethylenesalicylidene)-cyclohexane-1,2-diamino metal (III) chloride, N—N'-bis(5-methyl ethylenesalicylidene)-cyclohexane-1,2-diamino metal (III) chloride, N—N'-bis(3-tert-butyl ethylenesalicylidene)-cyclohexane-1,2-diamino metal (III) chloride, N—N'-bis(5-tert-butyl ethylenesalicylidene)-cyclohexane-1,2-diamino metal (III) chloride, N—N'-bis(3-methyl, 5-tert-butyl ethylenesalicylidene)-cyclohexane-1,2-diamino metal (III) chloride, N—N'-bis(3-tert-butyl, 5-methyl ethylenesalicylidene)-cyclohexane-1,2-diamino metal (III) chloride, N—N'-bis(3-tert-butyl, 5-trifluoromethyl ethylenesalicylidene)-cyclohexane-1,2-diamino metal (III) chloride, N—N'-bis(3-tert-butyl, 5-methoxy ethylenesalicylidene)-cyclohexane-1,2-diamino metal (III) chloride, N—N'-bis(3-tert-butyl, 5-nitro ethylenesalicylidene)-cyclohexane-1,2-diamino metal (III) chloride, N—N'-bis(3-tert-butyl, 5-chloro ethylenesalicylidene)-cyclohexane-1,2-diamino metal (III) chloride, N—N'-bis(3-methyl, 5-trifluoromethyl ethylenesalicylidene)-cyclohexane-1,2-diamino metal (III) chloride, N—N'-bis(3-methyl, 5-methoxy ethylenesalicylidene)-cyclohexane-1,2-diamino metal (III) chloride, N—N'-bis(3-methyl, 5-nitro ethylenesalicylidene)-cyclohexane-1,2-diamino metal (III) chloride, or N—N'-bis(3-methyl, 5-chloro ethylenesalicylidene)-cyclohexane-1,2-diamino metal (III) chloride.

21. The process for cyclic carbonate production according to claim 11, wherein the mole ratio of the metal complex in a) to the organic compound as the co-catalyst in b) is in the range of 1:0.5 to 1:300.

22. The process for cyclic carbonate production according to claim 21, wherein the mole ratio of the metal complex in a) to the organic compound as the co-catalyst in b) is in the range of 1:0.5 to 1:200.

23. The process for cyclic carbonate production according to claim 11, wherein the mole ratio of the metal complex in a) to epoxides is in the range of 1:100 to 1:20000.

24. The process for cyclic carbonate production according to claim 23, wherein the mole ratio of the metal complex in a) to epoxides is in the range of 1:1000 to 1:20000.

25. The process for cyclic carbonate production according to claim 11, wherein the $CO_2$ pressure is in the range of 15 to 600 psi.

26. The process for cyclic carbonate production according to claim 25, wherein the $CO_2$ pressure is in the range of 15 to 300 psi.

27. The process for cyclic carbonate production according to claim 11, wherein the contact of $CO_2$ and epoxides to the catalyst composition is operated under organic solvent-free condition, wherein the organic compound as the co-catalyst in b) is selected from 4-dimethylaminopyridine, tetrabutylammonium bromide, tetrabutylammonium chloride, tetrabutylammonium iodide, imidazolium bromide, imidazolium chloride, imidazolium iodide, bis(triphenylphosphine) iminium bromide, bis(triphenylphosphine) iminium chloride, bis(triphenylphosphine) iminium iodide, or mixture thereof.

28. The process for cyclic carbonate production according to claim 27, wherein the contact of $CO_2$ and epoxides to the catalyst composition is operated under organic solvent-free condition, wherein the organic compound as the co-catalyst in b) is selected from tetrabutylammonium bromide.

29. The process for cyclic carbonate production according to claim 11, wherein the contact of $CO_2$ and epoxides to the catalyst composition is operated under the presence of organic solvent selected from dichloromethane, hexane, benzene, toluene, dimethylformamide, or mixture thereof.

30. The process for cyclic carbonate production according to claim 29, wherein the organic solvent is dichloromethane.

31. The process for cyclic carbonate production according to claim 29 or 30, wherein the contact of $CO_2$ and epoxides to the catalyst composition is operated under the presence of organic solvent, wherein the organic compound as the co-catalyst in b) is selected from 4-dimethylaminopyridine, tetrabutylammonium bromide, tetrabutylammonium chloride, tetrabutylammonium iodide, imidazolium bromide, imidazolium chloride, imidazolium iodide, bis(triphenylphosphine) iminium bromide, bis(triphenylphosphine) iminium chloride, bis(triphenylphosphine) iminium iodide, or mixture thereof.

32. The process for cyclic carbonate production according to claim 31, wherein the contact of $CO_2$ and epoxides to the catalyst composition is operated under the presence of organic solvent, wherein the organic compound as the co-catalyst in b) is selected from 4-dimethylaminopyridine.

33. The process for cyclic carbonate production according to claim 11, wherein epoxide is selected from ethylene oxide, propylene oxide, styrene oxide, 1-butene oxide, 1-hexene oxide, cyclohexene oxide, cyclopentene oxide, epichlorohydrin, 3,4-epoxy-1-butene, or 1,2-epoxy-3-phenoxypropane.

34. The process for cyclic carbonate production according to claim 33, wherein epoxide is epichlorohydrin.

35. The process for cyclic carbonate production according to claim 11, wherein the reaction temperature is in the range of 65 to 150° C.

* * * * *